US012675492B1

(12) United States Patent
Dziergas et al.

(10) Patent No.: US 12,675,492 B1
(45) Date of Patent: Jul. 7, 2026

(54) CONTEXT-DRIVEN RESULT EXTRACTION SYSTEM AND METHOD

(71) Applicant: Wesco Digital Solutions (Ireland) Limited, Dublin (IE)

(72) Inventors: Marek Dziergas, Wheeling, IL (US); Rafael da Matta Navarro, Houston, TX (US); Avinash Wesley, New Caney, TX (US); Kishor Saitwal, Sugar Land, TX (US); Shashi Bhushan Dande, Spring, TX (US)

(73) Assignee: Wesco Digital Solutions (Ireland) Limited, Dublin (IE)

( * ) Notice: Subject to any disclaimer, the term of this patent is extended or adjusted under 35 U.S.C. 154(b) by 0 days.

(21) Appl. No.: 19/319,179

(22) Filed: Sep. 4, 2025

(51) Int. Cl.
*G06F 16/00* (2019.01)
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
CPC ........... G06F 16/24575; G06F 16/9558; G06F 16/90328; G06F 16/248; G06F 16/93; G06F 16/9538; G06F 16/3325; G06F 16/9535; G06F 16/2457; G06F 16/2455; G06F 16/242; G06F 16/2425; G06F 16/2428; G06F 16/252; G06F 16/24545; G06F 16/9532; G06N 3/084; G06N 3/0499; G06N 3/08; G06N 3/048; G06N 3/09
See application file for complete search history.

(56) References Cited

U.S. PATENT DOCUMENTS

| | | | | |
|---|---|---|---|---|
| 12,026,155 B2 * | 7/2024 | Bigdelu | .............. | G06F 16/2428 |
| 2015/0302036 A1 * | 10/2015 | Kumar | ................ | G06F 16/3325 |
| | | | | 707/711 |
| 2019/0073610 A1 * | 3/2019 | Rousselot | ........... | G06F 16/9537 |
| 2020/0065412 A1 * | 2/2020 | Braundmeier | ......... | G06N 3/084 |
| 2025/0217418 A1 * | 7/2025 | Bathwal | ........... | G06F 16/24575 |

* cited by examiner

*Primary Examiner* — Yicun Wu
(74) *Attorney, Agent, or Firm* — K&L Gates LLP

(57) ABSTRACT

The present disclosure provides a system and method for context-driven search result and extraction from a content node network. An interface module receives user-defined queries, presents structured search results, and obtains user feedback. A query processing module, including a crawler module, a content extraction module, and a result extraction module, can leverage machine learning algorithms to navigate content nodes, parse relevant content, and generate the structured search results. The system can dynamically select which machine learning algorithms to use based on query parameters, adapt the algorithms based on user feedback, and employ retrieval-augmented generation, achieving a technological improvement over existing crawling and scraping approaches.

20 Claims, 7 Drawing Sheets

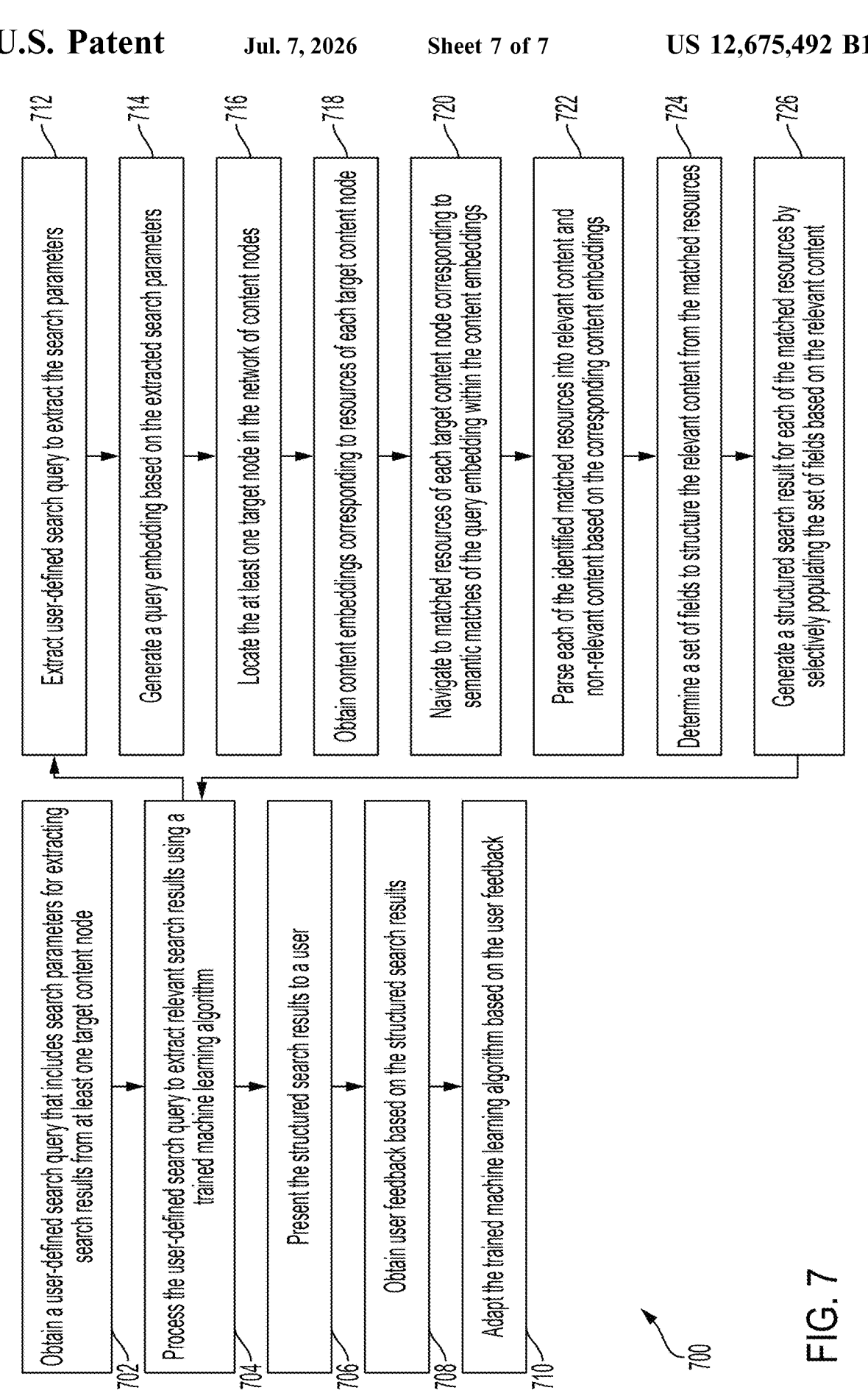

Obtain a user-defined search query that includes search parameters for extracting search results from at least one target content node 702

Process the user-defined search query to extract relevant search results using a trained machine learning algorithm 704

Present the structured search results to a user 706

Obtain user feedback based on the structured search results 708

Adapt the trained machine learning algorithm based on the user feedback 710

Extract user-defined search query to extract the search parameters 712

Generate a query embedding based on the extracted search parameters 714

Locate the at least one target node in the network of content nodes 716

Obtain content embeddings corresponding to resources of each target content node 718

Navigate to matched resources of each target content node corresponding to semantic matches of the query embedding within the content embeddings 720

Parse each of the identified matched resources into relevant content and non-relevant content based on the corresponding content embeddings 722

Determine a set of fields to structure the relevant content from the matched resources 724

Generate a structured search result for each of the matched resources by selectively populating the set of fields based on the relevant content 726

CONTEXT-DRIVEN RESULT EXTRACTION SYSTEM AND METHOD

TECHNICAL FIELD

The present disclosure relates generally to the field of crawling and scraping digital repositories, and more specifically to methods and systems for context-driven result extraction from a network of content nodes.

BACKGROUND

Content nodes, such as websites, online databases, social media platforms, digital archives, and other digital repositories, generally serve as sources of information accessible via a network. Extracting content from content nodes can be useful for a variety of purposes. For example, extracted content may be used for analyzing trends, conducting research, identifying business leads, gathering competitive intelligence, etc. However, the process of extracting content from content nodes can present technological challenges related to the volume, diversity, and complexity of the available content.

Traditional approaches to searching content nodes and extracting relevant information often rely on manual processes. For example, individuals or teams may manually review websites or other digital repositories for relevant content. These approaches are inherently time-consuming, requiring significant human effort to navigate to, analyze, and extract the relevant content within target content nodes. Moreover, because of their manual nature, traditional approaches lack scalability, limiting the volume of content nodes that can be effectively searched.

While some automated tools for extracting information from content nodes exist, these tools also have limitations. For example, various web scraping tools can be used to extract text from websites but typically require a specific configuration (e.g., hard coding) for identifying elements within a particular website, making them ineffective for broad or dynamic searches across diverse content nodes. Without being specifically configured to a particular website, web scraping tools often lack the ability to determine which portions of a website are relevant for content extraction. Moreover, these tools are also often limited to extracting raw text and lack the capability to process or analyze the extracted data to generate actionable insights.

Accordingly, there exists a need for alternative systems and methods that are capable of identifying relevant content within a network of context nodes, extracting the content, and generating search results that provide actionable insights based on the extracted content.

SUMMARY

In various embodiments, the present disclosure provides a system for context-driven search and result extraction in a network of content nodes. The system includes an interface module and a query processing module. The interface module obtains a user-defined search query comprising search parameters for extracting search results from at least one target content node, present structured search results to the user, and obtain user feedback based on the structured search results. The query processing module processes the user defined query and extract relevant search results using at least one trained machine learning algorithm. The query processing module receives and processes the user feedback obtained by the interface module to adapt the trained machine learning algorithm.

In some embodiments, the query processing module includes a crawler module, a content extraction module, and a result extraction module. The crawler module processes the user-defined search query to extract the search parameters, generate a query embedding based on the extracted search parameters, locate the at least one target content node in the network of content nodes, obtain content embeddings corresponding to resources located at each target content node from a vector database, and determine semantic matches to the query embedding within the obtained content embeddings and navigate to matched resources identified in each target content node. The content extraction module parses each of the identified matched resources into relevant content and non-relevant content based on the corresponding content embeddings. The result extraction module determines a set of fields to structure the relevant content from the matched resources and generate a structured search result for each of the matched resources by selectively populating the set of fields based on the content embeddings of the relevant content.

In some embodiments, the content extraction module identifies, within the matched resources, nested links corresponding to additional resources of the at least one target content node and communicate the nested links to the crawler module for determining additional semantic matches.

In some embodiments, the result extraction module defines weights for each field of the set of fields and score each of the structured search results based on the weights of the populated fields.

In some embodiments, the result extraction module generates a result embedding for each of the structured search results, determine a similarity of each result embedding with the other result embeddings, and remove duplicate structured search results for result embeddings having a similarity with each other greater than a predetermined threshold.

In some embodiments, the crawler module uses a first trained machine learning algorithm, the content extraction module uses a second trained machine learning algorithm, and the result extraction module uses a third trained machine learning algorithm.

In some embodiments, the interface module dynamically selects a preferred trained machine learning algorithm from a plurality of trained machine learning algorithms to use for one or more of the first trained machine learning algorithm, the second trained machine learning algorithm, and the third trained machine learning algorithm based on the search parameters.

In some embodiments, the interface module includes an agentic artificial intelligence agent selects the preferred trained machine learning algorithm to use for one or more of the first trained machine learning algorithm, the second trained machine learning algorithm, and the third trained machine learning algorithm based on the search parameters.

In some embodiments, the interface module communicates with a search engine to select the at least one target content node based on the search parameters.

In some embodiments, the crawler module utilizes a retrieval-augmented generation process to generate the query embedding, search the vector database for the content embeddings based on a similarity with the query embedding, and determine the matched resources based on the content embeddings having a similarity with the query embedding greater than a predetermined threshold.

In some embodiments, adapting the trained machine learning algorithm includes adjusting one or more weights of the trained machine learning algorithm based on the user feedback.

In various embodiments, the present disclosure provides a method for context-driven search and result extraction in a network of content nodes. The method includes obtaining, by an interface module, a user-defined search query comprising search parameters for extracting search results from at least one target content node and processing, by a query processing module, the user defined query to extract relevant search results using a trained machine learning algorithm.

In some embodiments, the processing of the user-defined search query includes extracting, by a crawler module, the user-defined search query to extract the search parameters, generating, by the crawler module, a query embedding based on the extracted search parameters, locating, by the crawler module, the at least one target node in the network of content nodes, obtaining, by the crawler module from a vector database, content embeddings corresponding to resources of each target content node, and navigating, by the crawler module, to matched resources of each target content node corresponding to semantic matches of the query embedding within the content embeddings.

In some embodiments, the processing of the user-defined search query includes parsing, by a content extraction module, each of the identified matched resources into relevant content and non-relevant content based on the corresponding content embeddings.

In some embodiments, the processing of the user-defined search query includes determining, by a result extraction module, a set of fields to structure the relevant content from the matched resources and generating, by the result extraction module, a structured search result for each of the matched resources by selectively populating the set of fields based on the relevant content.

In some embodiments, the method includes presenting, by the interface module, the structured search results to a user, obtaining, by the interface module, user feedback based on the structured search results, and adapting, by the processing module, the trained machine learning algorithm based on the user feedback.

In some embodiments, the method includes identifying, by a content extraction module, nested links within the matched resources corresponding to additional resources of the at least one target content node and communicating, by content extraction module, the nested links to the crawler module for identifying additional semantic matches.

In some embodiments, the method includes defining, by the result extraction module, weights for each field of the set of fields and scoring, by the result extraction module, each of the structured search results based on the weights of the populated set of fields.

In some embodiments, the method includes generating, by the result extraction module, a result embedding for each of the structured search results, determining, by the result extraction module, a similarity of each result embedding with the other result embeddings, and removing, by the result extraction module, duplicate structured search results for result embeddings having a similarity with each other greater than a predetermined threshold.

In some embodiments, the crawler module uses a first trained machine learning algorithm, the content extraction module uses a second trained machine learning algorithm, and the result extraction module uses a third trained machine learning algorithm.

In some embodiments, the method includes dynamically selecting, by the interface module, a preferred trained machine learning algorithm from a plurality of trained machine learning algorithms to use for one or more of the first trained machine learning algorithm, the second trained machine learning algorithm, and the third trained machine learning algorithm based on the search parameters.

In some embodiments, the interface module includes an agentic artificial intelligence agent selects the preferred trained machine learning algorithm to use for one or more of the first trained machine learning algorithm, the second trained machine learning algorithm, and the third trained machine learning algorithm based on the search parameters.

In some embodiments, the method includes communicating, by the interface module, with a search engine to select the at least one target content node based on the search parameters.

In some embodiments, the crawler module utilizes a retrieval-augmented generation process including generating the query embedding, searching the vector database for the content embeddings based on a similarity with the query embedding, and determining the matched resources based on the content embeddings having a similarity with the query embedding greater than a predetermined threshold.

In various embodiments, the present disclosure provides a non-transitory computer-readable medium storing instructions. The instructions, when executed by one or more processors, cause a computing system to obtain a user-defined search query comprising search parameters for extracting search results from at least one target content node of a network of content nodes, process the user-defined search query and extract relevant search results using a trained machine learning algorithm, present the structured search results to the user via a user interface, obtain user feedback based on the structured search results, and adapt the trained machine learning algorithm based on the user feedback.

In some embodiments, the instructions to process the user-defined search query cause the computing system to process the user-defined search query to extract the search parameters, generate a query embedding based on the extracted search parameters, locate the at least one target node in the network of content nodes, obtain content embeddings corresponding to resources of each target content node from a vector database, determine semantic matches to the query embedding within the obtained content embeddings and navigate to matched resources of the content node, parse each of the identified matched resources into relevant content and non-relevant content based on the corresponding content embeddings, determine a set of fields to structure the relevant content from the matched resources, and generate a structured search result for each of the matched resources by selectively populating the set of fields based on the content embeddings of the relevant content.

BRIEF DESCRIPTION OF THE DRAWINGS

FIG. 7 is a flow diagram illustrating an embodiment of a method 700 for context-driven search and result extraction in a network of content nodes.

DESCRIPTION

Figure 1:
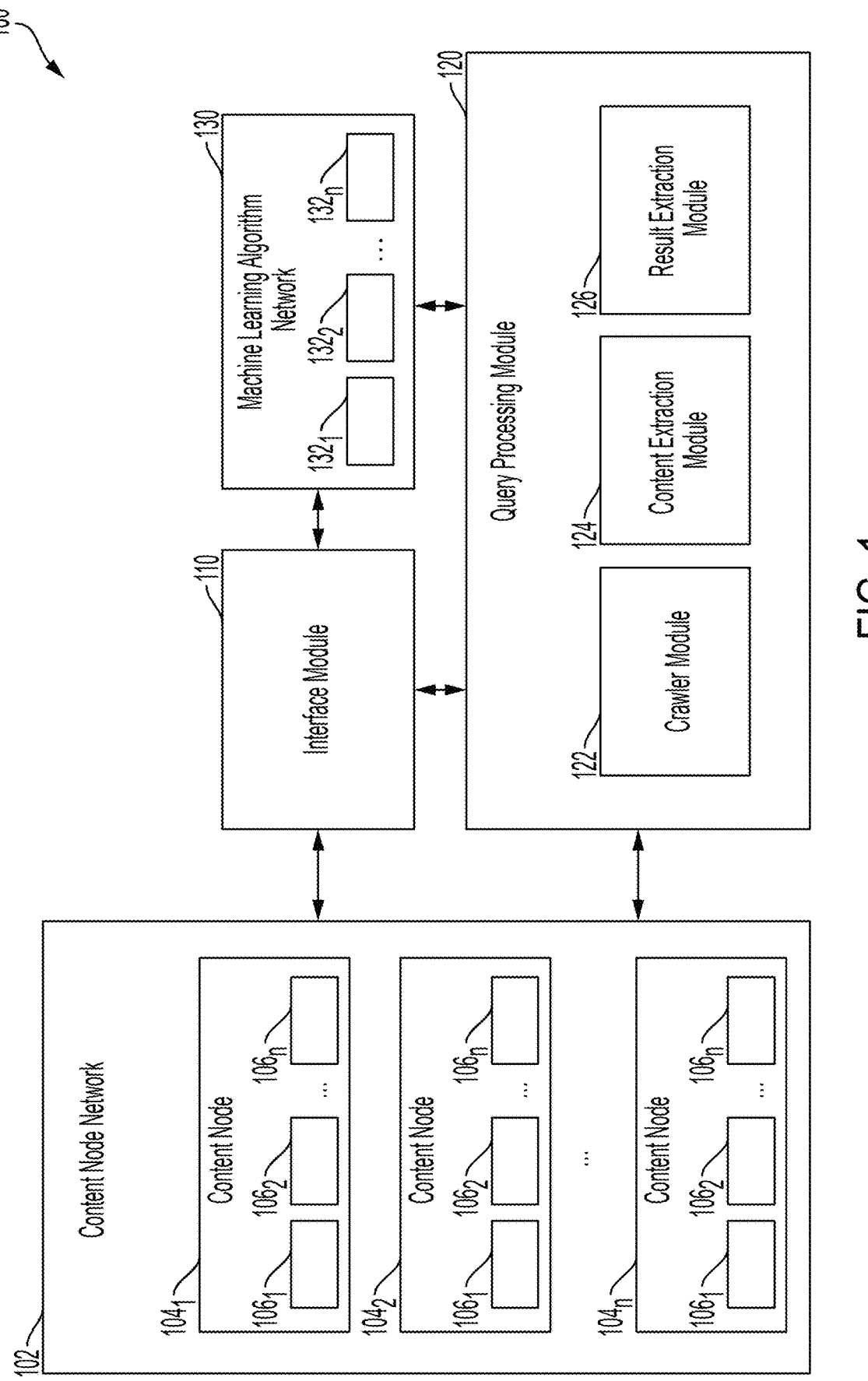
FIG. 1 is a schematic diagram illustrating an embodiment of a system for context-driven search and result extraction.

The present disclosure provides a system and method for context-driven result extraction. The system and method can streamline result extraction from content nodes by integrating a user interface module and a query processing module. The intake interface module can obtain search queries with search parameters for extracting search results from target content nodes. The query processing module, based on the search parameters, can use a trained machine learning algorithm and semantic analysis to navigate to appropriate resources within the target content nodes, determine relevant content for extraction, and generate structured results that are presented to users via the intake interface. Feedback provided by the users is used to adapt the trained machine learning algorithm.

The system and method can address various technical challenges related to existing approaches. For example, the query processing module, by using semantic analysis to navigate to appropriate resources within target content nodes and determine relevant content for extraction, can enable extraction of relevant from content nodes without requiring the query processing module to be specifically configured to the target content nodes. Furthermore, by generating structured results from the extracted content, users are provided with information that can provide actional insights. Adapting the trained machine learning algorithm based on feedback from the users can improve performance related to navigation to and extraction of relevant content.

The system and method provide numerous technological advantages. For example, as discussed further herein, a crawler module may identify semantic matches between a query embedding and content embeddings corresponding to resources of target content node (e.g., webpages of a website). This can enable the crawler module to dynamically identify and navigate to resources that are relevant to the query without reliance on hard coded rules or site-specific configurations. This approach leverages high-dimensional vector representations of the resources to capture semantic relationships, allowing the crawler module to process diverse and structurally heterogeneous content nodes, such as websites, databases, social media platforms, etc. Furthermore, the crawler module may utilize a retrieval-augmented generation (RAG) process to enhance computational efficiency by retrieving precomputed content embeddings from a vector database and performing real-time similarity comparisons. The crawler module can therefore reduce latency and resource demands compared to traditional crawling and scraping methods that require exhaustive parsing of entire content nodes.

As another example, a content extraction module, using the content embeddings, may parse each of the semantically matched resources (e.g., web pages) into relevant and non-relevant content. For example, the content extraction module can employ transformer-based machine learning algorithms to analyze semantic and structural features of a webpage, thus enabling the content extraction module to adapt to variations in webpage structure and identify information relevant to the query while filtering out extraneous elements such as advertisements or navigation menus. In contrast, traditional web scrapers are often dependent on hard-coded rules or templates for content extraction and typically struggle with dynamic or unstructured content. Furthermore, via an iterative feedback loop, the content extract module can identify nested links directed to additional resources and feed the nested links to the crawler module for semantic analysis. This enhances the system's capability to explore interconnected resources within content nodes, ensuring comprehensive coverage of target content nodes without the need for manual intervention, thereby improving the scalability and robustness against variability in content node structures.

As yet another example, a result extraction module may be utilized to generate structured search results by selectively populating a dynamically determined set of result fields. The result extraction module can dynamically determine the set of fields by analyzing the search query embedding to identify information categories relevant to the user's intent. The fields can then be mapped to content embeddings of the relevant content from the matching resource for populating the structured search result. Thus, the result extraction module can produce organized results tailored to the user's intent, significantly reducing post processing of the results and enhancing data usability.

The integrated operation of the crawler module, content extraction module, and result extraction module collective provide a technological advantage by enabling a cohesive, end-to-end system for context-driven search and result extraction that can outperform traditional approaches in efficiency and adaptability. The crawler module's use of query embeddings and semantic matching for navigation to relevant resources, the content extraction module's parsing of relevant and non-relevant content across diverse content node structures, and the result extraction module's dynamic field determination for producing structured outputs enables comprehensive and accurate crawling and scraping of diverse content nodes without requiring the hard-coding or content-node-specific reconfiguration.

FIG. 1 illustrates an embodiment of a system 100 for context-driven search and result extraction. The system 100 processes queries to identify target content nodes, extracts relevant information from their resources, and generates results tailored to user's requirements. The system 100 can facilitate scalable and automated content extraction by dynamically navigating diverse types of digital repositories. The system 100 may use trained machine learning algorithms for navigation, content extraction, and result generation, and the trained machine learning algorithms may be adapted based on user feedback to achieve improved performance. Any aspects of the system 100 may be combined with any of the other embodiments of the system and method for context-driven search and result extraction disclosed herein, and vice versa.

The system 100 can navigate to and extract relevant content from a content node network 102. The content node network 102 is a distributed collection of digital repositories accessible via a communication network. The content node network 102 includes a plurality of content nodes 104$_1$, 104$_2$, . . . 104$_n$ (sometimes referred to collectively as content nodes 104 or each individually as a content node 104). Each of the content nodes 104 can represent an individual digital repository that includes a collection of resources 106$_1$, 106$_2$, . . . 106$_n$ (sometimes referred to collectively as resources 106 or each individually as a resource 106).

The content node network 102 can represent various types of digital repositories. For example, the content node network 102 may represent the World Wide Web, with each of the content nodes 104 corresponding to individual websites and each of the resources 106 representing a specific web page, product listing, document, multimedia file, and/or other type of digital information. As another example, the content node network 102 may represent a collection of online databases with each of the content nodes 104 corresponding to an individual database and each of the resources 106 representing a record, dataset, document, and/or other type of digital information. As yet another example, the content node network 102 may represent a collection of social media platforms with the content nodes 104 corresponding to individual platforms and the resources 106 representing user posts, profiles, comments, and/or other types of digital social media content. In other examples, the content node network 102 may include e-commerce platforms, content repositories, and/or any combination of various types of digital repositories.

The content node network 102 may be implemented through a distributed infrastructure of servers and hardware that host and manage the content nodes 104 and their resources. For example, each content node 104 may be hosted by one more servers (e.g., web servers, database servers, cloud-based virtual machines) connected via the Internet and/or private networks.

The system 100 includes an interface module 110. The interface module 110 can obtain user-defined search queries comprising search parameters for extracting search results from at least one of the content nodes 104. The interface module 110 can also present structured search results to the users. The interface module 110 may obtain user feedback based on the structured search results. The feedback may be used by the system 100 for adapting one or more trained machine learning algorithms used for locating target content nodes 104, matching resources 106 within the target content nodes 104 to the search parameters, identifying relevant content and nonrelevant content within the matching resources 106, and generating structured search results from relevant content extracted from the matching resources 106. The feedback obtained by the interface module 110 may be leveraged to improve the relevance and precision of results obtained from subsequent queries to adaptation of the one or more trained machine learning algorithms.

The interface module 110 may prompt users to specify parameters that define the scope and/or purpose of the desired search results. The search parameters may include parameters defining a type of content node network 102 (e.g., the web, databases, social media platforms, e-commerce platforms). The search parameters may include parameters defining the intent of the search (e.g., analyzing trends, conducting research, surveying available information about a topic, identifying business leads, gathering competitive intelligence). The search parameters may include parameters defining specific information and details sought within structured search results. The query may further define a set of fields based on the specific information and details sought that are selectively populated with extracted content to generate the structure results. For example, a user may interact with the interface module 110 to submit a query for the purpose of generating business leads for a particular type of business (e.g., upcoming projects that are seeing requests for quotes). Based on user inputs, the interface module 110 can define parameters of the user's query to indicate that the query is for searching resources 106, such as press releases, articles, and requests for quotes for planned business projects, within content nodes 104, such as websites and social media platforms, to generate structured results (e.g., business leads). The set of fields may include fields such as a project name, quote deadline, point of contact, email address, phone number, company name, location, value, etc.

The interface module 110 can allow users to designate specific target content nodes 104 within the content node network 102, such as particular websites, online databases, or social media platforms, for targeted search and extraction. Additionally, or alternatively, the interface module 110 can autonomously identify target content nodes 104 based on the search parameters of the user's query. For example, the interface module 110 may employ a search engine to identify one or more target content nodes 104 with the content node network 102 by matching keywords or phrases from the query to relevant domains or metadata. The interface module can use contextual information related to the user's query to identify one or more target content nodes 104 with the content node network 102.

The interface module 110 can implement a user interface accessible by user devices (e.g., laptops, tablets, smartphones) via a communication network. The user interface may include one or more text boxes for entering search queries and/or search parameters, one or more dropdown menus for selecting various content categories (e.g., industry sectors, data types), and various other user interface elements such as sliders, buttons, etc. for selecting and filtering content within the structured search results.

The interface module 110 may utilize agentic artificial intelligence (AI) agent to assist users in crafting comprehensive and effective searches. The agentic AI agent may dynamically engage with users, prompting users to input additional details or clarifications to enhance query specificity. The agentic AI agent may employ natural language processing and contextual understanding to ensure that user queries are well-defined, reducing ambiguity and enabling the system 100 to deliver relevant and actionable results.

The system 100 includes a query processing module 120. The query processing module 120 can process user-defined queries obtained by the interface module 110, extract relevant content from the content node network 102, and generate structured search results for the interface module 110 to present to users. As discussed below, the query processing module 120 may include a crawler module 122, a content extraction module 124, and a result extraction module 126.

The query processing module 120 is communicably couplable with a machine learning algorithm network 130. The machine learning algorithm network 130 may include one or more trained machine learning algorithms $132_1$, $132_2$, . . . 132 (sometimes referred to collectively as trained machine learning algorithms 132 or each individually as a trained machine learning algorithm 132). The query processing module can leverage one or more of the trained machine learning algorithms 132 to perform searching, extraction, structured result generation.

The query processing module 120 and/or the interface module 110 may dynamically select different trained machine learning algorithms 132 to employ based on parameters of the user-defined query. For example, some of the trained machine learning algorithms 132 may be better at analyzing resources 106 within content nodes 104 compared to other trained machine learning algorithms 132. However, the trained machine learning algorithms 132 may be better at analyzing resources 106 within content nodes 104 may also require more computing power to execute (and therefore may be more costly to implement in a cloud-based computing environment). Some of the trained machine learning algorithms 132 may be better at analyzing resources 106 associated with particular topics or types of data formats compared to other trained machine learning algorithms 132. The query processing module 120 and/or the interface module 110 (e.g., an agentic AI agent) may determine to use one or more machine learning algorithms 132 based on any one or more of the complexity and topic of the user query, the search parameters, the complexity and type of the target content nodes 104, and the complexity and or type of resources 106 at the target content nodes 104. This dynamic selection of the trained machine learning algorithms 132 can enhance the ability to the system 100 to adapt to different types of queries, optimize performance, and achieve better results.

The crawler module 122 may perform tasks of the query processing module 120 related to processing the user-defined query and navigating within the content node network 102 to identify relevant resources 106. The crawler module 122 can systematically process the query by extracting the search parameters, generate a query embedding based on the extracted search parameters, locate one or more target content nodes 104 and obtain content embeddings for resources 106 located at the target content nodes 104, and navigate to resources 106 with content embeddings that semantically match the query embedding. The crawler module 122 can use one or more trained machine learning algorithms 132 of the machine learning algorithm network 130 to process queries, generate embeddings, and identify semantic matches.

To process the user-defined search query and extract the search parameters, the crawler module 122 may employ natural language processing (NPL) techniques, such as tokenization, part-of-speech tagging, and named entity recognition, to parse the query text and identify elements such as keywords, phrases, content types, and/or specific constraints (e.g., geographic or temporal filters). In some embodiments, the crawler module 122 may use defined parsing rules or expressions to extract structured parameters such as industry categories or target domains from the query. The crawler module 122 may leverage one or more trained machine learning algorithms 132, such as a transformer-based model, to infer implicit parameters by analyzing the query's context and intent.

The crawler module 122 can generate a query embedding by transforming the extracted search parameters into a numerical vector representation in a high-dimensional vector space. This may be achieved using one or more trained machine learning algorithms 132, such as a Bidirectional Encoder Representations from Transformers (BERT)-based or custom-trained neural network, to encode semantic meanings of the extracted parameters.

To locate target content nodes 104 within the content node network 102, the crawler module 122 may employ a combination of search engine techniques and metadata analysis. For example, the crawler module 122 may match query parameters to content node 104 characteristics, such as domain names, content categories, metadata tags, using an integrated search engine or an indexing system. The location of target content nodes 104 may employ a selection and ranking process using one or more trained machine learning algorithms 132, such as a ranking or classification algorithm, to prioritize content nodes 104 based on their likelihood of containing relevant resources 106.

The crawler module 122 can obtain content embeddings for resources at each target content node 104 by querying a vector database that stores precomputed embeddings for each of the corresponding resources 106. The content embeddings may be numerical representations of the resources that capture their semantic meaning in a high-dimensional vector space. The embeddings may be generated by processing content of the resources (e.g., text, metadata, multimedia elements) using one or more trained machine learning algorithms 132 (e.g., a text-embedding model, a multimodal embedding model for text and metadata). For example, processing by a text-embedding model may convert textual content (e.g., webpage body text, titles, headings, navigation menus) into vectors by analyzing word relationships, context, and semantic structures. As another example, a multimodal mode may process both text and metadata (e.g., HTML tags, URLs, image captions) to create embeddings to capture broader sematic context.

The vector database storing the content embeddings may be a specialized database for storing and indexing high-dimensional vectors to enable rapid retrieval based on similarity metrics. The vector database may be optimized for handling dense vectors. The vector database may use data structures (e.g., Hierarchical Navigable Small Word graphs, inverted file indices) to enable fast nearest-neighbor searches. To support computational demands of indexing and querying millions of high-dimensional vectors, the vector database may be deployed using hardware with significant processing powers, such as a multi-core CPUs or GPUs. For scalability, the vector database may be deployed on a distributed cluster using a cloud-based platform. Utilizing a vector database storing precomputed content embeddings of the target content node 104 can enable rapid retrieval of the content embeddings for real-time determination of semantic matches with the query embedding.

The crawler module 122 can determine semantic matches between the query embedding and the content embeddings of the resources 106 of the one or more target content nodes 104. The crawler module 122 may employ metrics such as cosine similarity, Euclidean distance, dot product, etc. to quantify the semantic proximity between the query embedding and the content embeddings of the resources 106 in the vector space. The crawler module 122 may use a threshold-based approach and/or a ranking algorithm to select the top matching the resources 106, improving efficiency and reducing required computing resources by ensuring that the most relevant resources 106 are selected.

In some embodiments, the crawler module 122 may employ a Retrieval-Augmented Generation (RAG) architecture to enhance the matching process, for example, by refining embeddings with contextual data. An example RAG method 500 that may be implemented is discussed further with respect to FIG. 5.

The crawler module 122, using the identifies semantic matches, can navigate to the matched resources by accessing their specific locations within the target content nodes 104. This navigation may include retrieving resource identifiers, such as Uniform Resource Locators (URLs) for web pages, database record IDs, or API endpoints, from the vector database or content node 104 metadata. The crawler module 122 may employ Hypertext Transfer Protocol (HTTP) requests, Application Program Interface (API) calls, or database queries to access the content of the matched resources 106.

The content extraction module 124 may perform tasks of the query processing module 120 related to parsing matched resources 106 identified by the crawler module 122 into relevant and non-relevant content based on the user-defined search query. For example, when processing a matched resource 106 that is a webpage, the content extraction module 124 can distinguish between relevant content, such as an article or product description directly related to the query, and non-relevant content such as advertisements, navigation menus, side bars, or footer links. The content extraction module 124 can accurately isolate pertinent information, ensuring that content aligned with the query (e.g., business leads, market data, sentiment insights, academic research) is passed to the result extraction module 126 for further processing without the non-relevant content.

To parse the content of the matched resources 106, the content extraction module 124 can employ one or more trained machine learning algorithms 132 from the machine learning algorithm network 130, utilizing the content embeddings and query parameters to differentiate relevant content from non-relevant content. The content extraction module may retrieve the content embeddings of the identified matched resource 106 from the vector database, which may encode semantic and structural features of the components of the resource 106 (e.g., text blocks, HTML elements, database fields). Using a transformer-based model, such as BERT or a graph neural network, the content extraction module 124 can analyze the structure of the resource 106, parsing it into segments (e.g., a Document Object Model (DOM) element for a webpage, a JavaScript Object Notation (JSON) object for APIs) and mapping each segment into its corresponding embedding. The content extraction module 124 may compute relevance scores by comparing these segment embeddings to the query embedding, generated by the crawler module 122, using similarity metrics such as cosine similarly or attention mechanisms. Query search parameters, such as keywords or content type preferences, may guide the content extraction module 124 to prioritize segments matching the user's intent. Non-relevant content, such as advertisements or navigation lings, may be identified by low similarity scores or predefined structural patterns (e.g., HTML classes like "ad-banner" or "nav-menu") and filtered out using a classification layer within the content extraction module 124.

In some embodiments, the content extraction module 124 may employ a RAG architecture to enhance parsing, for example, by incorporating contextual knowledge from the vector database, improving the ability of the content extraction module 124 to handle diverse content forms and complex resource structures. An example RAG method 500 that may be implemented is discussed further with respect to FIG. 5.

The system 100, including the content extraction module 124, provides a significant technological improvement over existing web scrapers that require manual, site-specific configuration to identify and extract relevant data elements from a particular website. Traditional scrapers typically rely on hard-coded rules or templates, such as XPath (XML Path Language) or CSS (Cascading Style Sheets) selectors, tailored to a website's specific HTML structure, necessitating extensive reconfiguration when applied to new sites or when a site's layout changes. The content extraction module 124 can leverage machine-learning driven semantic analysis, enabling it to dynamically adapt to varying content node 104 structures without requiring predefined rules. By using content embeddings and trained algorithms, the content extraction module 124 can generalize across heterogeneous resources 106, such as webpages, database records, or social media posts, identifying relevant content based on semantic relevance rather than rigid structural patterns. This adaptability can reduce setup time, eliminate the need for site-specific programming, and can ensure robustness against structural changes in content nodes 104. Thus, the system 100 provides a technological improvement achieving adaptability and scalability.

The content extraction module 124 may identify nested link within the resources 106 it analyzes, enabling the discovery of additional relevant resources 106 for further exploration. During parsing, the content extraction module 124 can detect hyperlinks or references (e.g., URLs in HTML anchor tags, API endpoints in JSON responses, record IDs in databases) embedded in the resource's content or metadata. Using one or more trained machine learning algorithms 132, the content extraction module 124 can evaluate the relevance of the nested links by generating embeddings for their associated text and comparing them to the query embedding. Links with similarity scores above a determined threshold, indicating potential relevance to the query, are extracted and passed back to the crawler module 122. This iterative feedback loop can enhance the ability of the system 100 to comprehensively explore the content node network 102, uncovering data that might otherwise be overlooked.

The result extraction module 126 may perform tasks of the query processing module 120 related to transforming relevant content extracted from the matched resources 106 into structured search results that provide actional insights to users. The result extraction module 126 can determine a set of fields for organizing the relevant content based on the search parameters of the query and/or the semantic context of the content. The result extraction module 126 can generate a structured search result for each matched resource by selectively populating the set of fields using the content embeddings.

The set of fields used for generating structured search results can serve as a systematic framework for organizing the information extracted from the matched resources 106, making it accessible and actionable for users. For example, if the query pertains to finding business leads, the crawler module 122 may identify a press release within a content node 104 describing an upcoming project seeking bidders. This press release may contain details such as the company name, project description, bid submission deadlines, project value, and contact information. The set of fields, determined by the result extraction module 126, may include categories such as "Company Name," "Contact Person," "Project Value," "Location", "Bid Deadline," etc., each representing a piece of information relevant to the business lead. The structured search result may be generated as a table or similar data structure, where each field is populated with corresponding data extracted from the resource 106.

To determine the set of fields, the result extraction module 126 may analyze the query parameters and content embeddings using one or more of the trained machine learning algorithms 132, such as a transformer-based model or a custom classification model, from the machine learning algorithm network. The result extraction module 126 can process the query parameters, extracted by the crawler module 122, to identify information categories (e.g., corresponding to the fields) relevant to the user's intent. The result extraction module 126 may map the content embeddings of the relevant content extracted from the matching resource 106, retrieved from the vector database, using semantic analysis to identify which segments of the content correspond to each field. A named entity recognition (NER) model or a sequence labeling algorithm may be employed to tag specific entities, such as names or dates, within the relevant content.

In some embodiments, the result extraction module 126 may employ a RAG architecture to enhance field determination by incorporating external knowledge or predefined templates from the vector database. The RAG architecture may allow the result extraction module 126 to adaptively defile fields for diverse use cases without requiring manual configuration. An example RAG method 500 that may be implemented is discussed further with respect to FIG. 5.

The result extraction module 126 may enhance the utility of the structured search results by assigning weights to each field in the set of fields and scoring the results based on the weights. Each field may be assigned a weight reflecting its importance to the user's query, determined by analyzing the query search parameters or user preferences provided via the interface module 110. For example, for a lead generation query, a "Project Value" field may be assigned a higher weight than a "Location" field if the query's intent suggests that the user prioritizes high-value opportunities. When a field is populated with data from a matched resource 106, its weight contributes to an overall score for the structured search result, for example, calculated as a weighted sum or through a machine learning-based scoring function. The result extraction module 126 can rank the structured search results based on the scores, prioritizing results with higher relevance or completeness. This weighted ranking approach can enable the structured search results to be presented to users based on their potential value.

The result extraction module 126 may implement a deduplication process to ensure quality and uniqueness of the structured search results. The deduplication process may include generating a result embedding for each structured search result and comparing them for similarity. Each result embedding may be created by encoding the populated fields into a high-dimensional vector using one or more of the trained machine learning algorithms 132, such as a text-embedding model or a neural network trained for structured data. The result extraction module 126 can compute similarity scores between pairs of result embeddings using metrics like cosine similarity or Euclidean distance, identifying results that are substantially similar. If the similarity sore between a result embeddings pair exceeds a predetermined threshold, the result extraction module 126 can flag one as a duplicate and remove it. The result with the higher raking score may be retained for more complete field population.

The interface module 110 can present the structured search results generated by the result extraction module 126 to users via the user interface. The structured search results may be displayed in various forms, such as interactive tables with sortable columns, visual dashboards with charts summarizing various metrics, or downloadable reports. For example, a user interface of the interface module 110 may display a table of business leads with columns for company names, contact information, project deadlines, etc., allowing users to sort by priority or filter by location. Additionally, the interface module 110 and/or the query processing module 120 may store the structured search results in a database, such as a relational database or a NoSQL (Not Only SQL) database, enabling users to retrieve, review, or export results for further analysis or integration with external systems.

The interface module 110 can facilitate the collection of user feedback based on the structured search results to refine the performance of the system 100. Feedback may be gathered through various mechanisms within the user interface, such as enabling users to designate specific results as relevant or non-relevant, delete unwanted results, or provide direct feedback via an agentic AI agent. For example, user may be prompted to mark a result as "high priority," "relevant," "non-relevant," etc. by clicking checkboxes or buttons corresponding to each search result. The agentic AI agent may prompt users to respond to specific questions about the results to collect more nuanced feedback. In some embodiments, the interface module 110 may enable users to approve or deny specific results for inclusion in a data lake, a centralized repository for storing structured and/or unstructured data, by interacting with interface elements, such as approval tabs or a drag-and-drop workflow. The approval or denial of a result in the data lake can serve as a positive or negative feedback signal.

The feedback collected by the interface module 110 may be transmitted to the query processing module 120. The query processing module 120 may use the feedback to adapt one or more of the trained machine learning algorithms 132 within the machine learning algorithm network 130. The adaptation process may involve automatically fine tuning one or more of the trained machine learning algorithms 132 to improve their performance based on the feedback. For example, if a user marks a certain results as non-relevant, the query processing module 120 may adjust the weights of neural network layers in a transformer-based model (e.g., BERT or custom model) used by the crawler module 122 or the content extraction module 124. This may be achieved through techniques such as backpropagation and gradient descent, where a loss function is updated to penalize incorrect predictions (e.g., misclassified relevant content) based on feedback. For example, feedback indicating that a result with specific keywords was incorrectly prioritized may lead to adjustments in attention mechanisms or embedding weights to better align with the user's intent. In some embodiments, reinforcement learning techniques may be employed to optimize parameters by rewarding selections of relevant results and penalizing non selections. The query processing module 120 may also update the vector database content embeddings by retraining or reweighting to reflect feedback.

The system 100, including adapting one or more of the machine learning algorithms 132 based on user feedback, can provide a technological improvement over approaches that use a static or manually configured system. Traditional systems, such as conventional web scrapers, often lack the ability to dynamically refine their extraction logic based on user input, requiring manual reprogramming to address inaccuracies. The feedback-driven adaptation of the system 100 can enable continuous learning and improvement, allowing algorithms to better capture user intent and handle diverse content node structures without predefined rules. This adaptability can enhance scalability, reduce the need for manual intervention, and can ensure robustness against changes in the format of content nodes 104.

Figure 2:
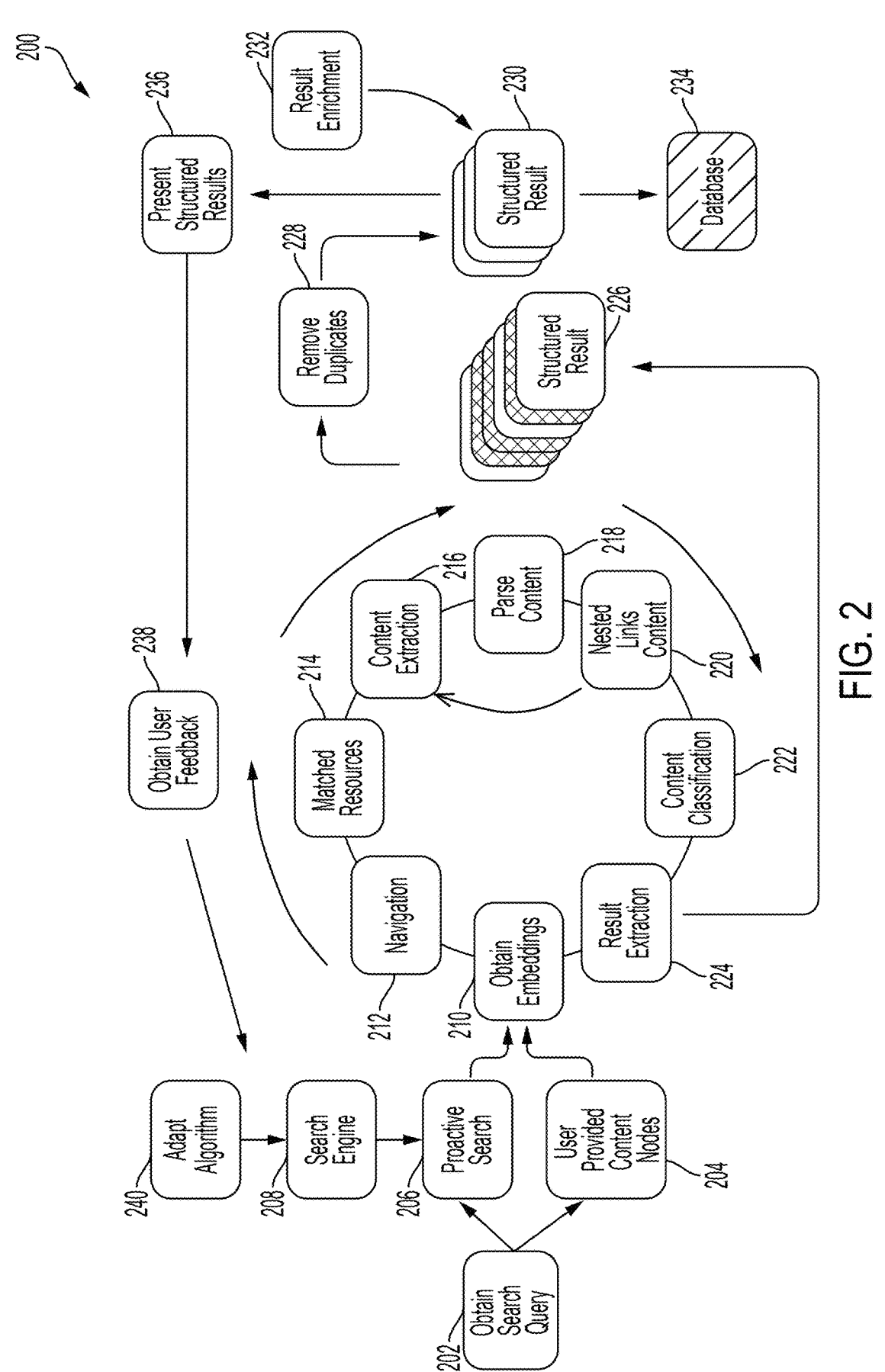
FIG. 2 is a flow diagram illustrating an embodiment of a method for context-driven search and result extraction.

FIG. 2 is a flow diagram illustrating an embodiment of a method 200 for context-driven search and result extraction. The method 200 may be implemented using the system 100. Any aspects of the system 100 and/or method 200 may be combined with any of the other embodiments of the system and/or method for context-driven search and result extraction disclosed herein, and vice versa.

According to the method 200, the interface module 110 obtains a user-defined search query 202. The search parameters of the query may define user-provided content nodes 204 (target content nodes 104 within the content node network 102) for a targeted search, specifying particular digital repositories, such as specific websites, databases, or social medial platforms, to focus the search. Additionally, or alternatively, the search parameters of the query may request a proactive search 206 of the content node network 102 to identify target content nodes 104, causing the system 100 to autonomously select relevant content nodes 104 to target based on query context without requiring explicit content node designations.

According to the method 200, the crawler module 122 may employ a search engine 208 to identify target content nodes during the proactive search 206. The search engine 208 may analyze query parameters, such as keywords, domains, or metadata, to locate content nodes 104 likely to include relevant resources 106.

According to the method 200, the crawler module 122 obtains embeddings 210 for resources within the identified target content nodes 104. The crawler module 122 may retrieve precomputed content embeddings from a vector database, which encode the semantic and structural features of each resource 106, such as text, metadata, or HTML elements, using one or more trained machine learning algorithms 132. The embeddings can enable the crawler module 122 to perform semantic comparisons between the query and resource content.

According to the method 200, the crawler module 122 performs navigation 212 to access matched resources 214. The crawler module 122 can generate a query embedding from the search parameters using one or more trained machine learning algorithms 132 and compute similarity scores between the query embedding and the content embeddings. Resources 106 with similarity scores above a predetermined threshold are identified as matched resources 214, and the crawler module 122 navigates to their specific locations (e.g., using HTTP requests, API calls) to retrieve their content.

According to the method 200, the content extraction module 124 performs content extraction 216 on the matched resources 214. This can involve parsing content 218 to separate relevant content from non-relevant content. The content extraction module 124 may use content embeddings and one or more of the trained machine learning algorithms 132 to classify content segments based on relevance to the query.

According to the method 200, the content extraction module 124 may identify nested content links 220 within the matched resources during content parsing. These links, such as hyperlinks in webpages or references in database records, may be evaluated for relevance by generating embeddings for their associated text and comparing them to the query embedding. Relevant nested links are fed back to the crawler module 122 to identify additional matched resources 214 for content extraction 216.

According to the method 200, the content extraction module 124 may perform content classification 222 to finalize the identification of relevant content. Using one or more of the trained machine learning algorithms 132, the content extraction module 124 can assign relevance scores to the parsed content segments by comparing their embeddings to the query embeddings. Segments with scores above a predetermined threshold may be classified as relevant, while others may be discarded, ensuring that relevant content is passed to the result extraction module 126.

According to the method, the result extraction module 126 performs result extraction 224 to generate structured results 226. The result extraction module 126 can determine a set of fields based on the query parameters and populate the fields with relevant content using the content embeddings and semantic mapping. The structured results 226 may be organized at tables or similar data structures.

According to the method 200, the result extraction module 126 removes duplicates 228 from the structured results 226 to produce a refined set of structured results 230. To remove the duplicates, the result extraction module 126 may generate result embeddings for each structured result 226 using one or more of the trained machine learning algorithms 132 and compute a similarity score for each possible pair of result embeddings. Structured results 226 with similarity scores above a predetermined threshold may be flagged as duplicates and one of the pair may be removed to achieve the refined set of structured results 230.

According to the method 200, the result extraction module 126 may perform result enrichment 232 to enhance the structured results 230. The structured results 230 may be augmented with additional data, such as cross-referencing contact details with external databases or adding additional contextual metadata (e.g., industry trends) using a RAG architecture.

According to the method 200, the structured results 230 may be stored in a database 234 by the query processing module 120 and/or the interface module 110.

According to the method 200, the interface module 110 presents the structed results 236 via the user interface. The results may be displayed by the user interface such that users can review, sort, filter and/or prioritize the results.

According to the method, the interface module 110 obtains user feedback 238 based on the structured results 230 that are presented. Feedback may be collected through various interface elements based on marking results as relevant or non-relevant, approving or denying results, deleting unwanted results, or providing feedback through an agentic AI chatbot.

According to the method 200, the query processing module 120 can adapt an algorithm 240 (e.g., one or more of the trained machine learning algorithms 132) based on the feedback. Adapting the algorithm can include fine-tuning model weights via back propagation or reinforcement learning, for example. Adapting the algorithm can include adjusting embedding generation, similarity scoring, structured result weighting, or classification processes to better alight with user preferences.

Figure 3:
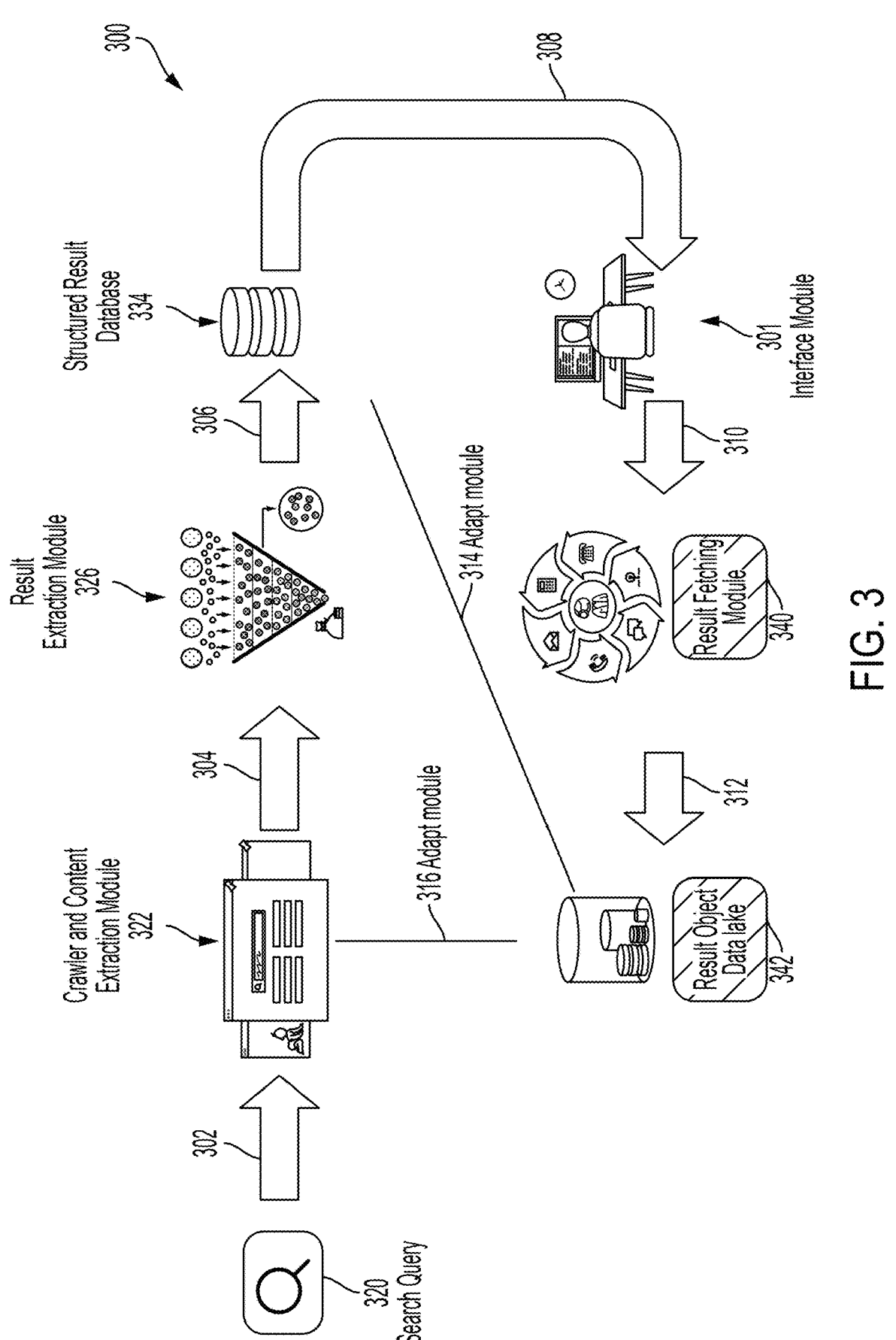
FIG. 3 is a flow diagram illustrating an embodiment of a method for context-driven search and result extraction.

FIG. 3 illustrates a flow diagram of a method 300 for context-driven search result and extraction. The method 300 may be implemented by a system including a crawler and content extraction module 332, a result extraction module 326, an interface module 301, and a result fetching module 340. The embodiment of the system performing the method 300, and its components, may be similar to the embodiment of the system 100, and its components (e.g. the crawler and content extraction module 322 may include features similar to the crawler module 122 and/or the content extraction module 124, the interface module 301 may include features similar to the interface module, the result extraction module 326 may include features similar to the result extraction module 126). Any aspects of the system and/or method 300 may be combined with any of the other embodiments of the system and/or method for context-driven search and result extraction disclosed herein, and vice versa.

According to the method 300, the crawler and content extraction module 322 receive 302 a search query 320. The search query 320 can include search parameters, such as keywords or content types, which can guide the crawler and content extraction module 322 in identifying and extracting relevant content from a content node network.

According to the method 300, the crawler and content extraction module 322 process the search query to identify and parse matched resources, passing 304 relevant content to the result extraction module 326.

According to the method 300, the result extraction module 326 generates structured search results from the extracted content and stores 306 the structured search results in a structured search result database 334. The result extraction module 326 generates structured search results by determining a set of fields based on the search query 320 and populating the set of fields with relevant data, creating organized outputs.

According to the method 300, the interface module 301 obtains the structured search results from the structured search result database 334. The interface module 301 displays the results as interactive tables or dashboards, allowing users to review, approve or deny, and/or provide feedback based on the results.

According to the method 300, the result fetching module 340 retrieves 310 user-approved results from the structured search result database 334 and stores 312 them in in a result object data lake 342. The result object data lake can serve as a centralized repository for persistent storage, enabling further analysis or integration with external systems.

According to the method 300, feedback associated with results in the result object data lake 342 can be used to adapt 314 the result extraction module 326, for example, to improve data field determination and generation of the structured results.

According to the method 300, feedback associated with results in the result object data lake 342 can be used to adapt 314 the crawler and content extraction module 332, for example, to improve identification of matching resources within content nodes and parsing of the matched resources to identify relevant and non-relevant content.

Figure 4:
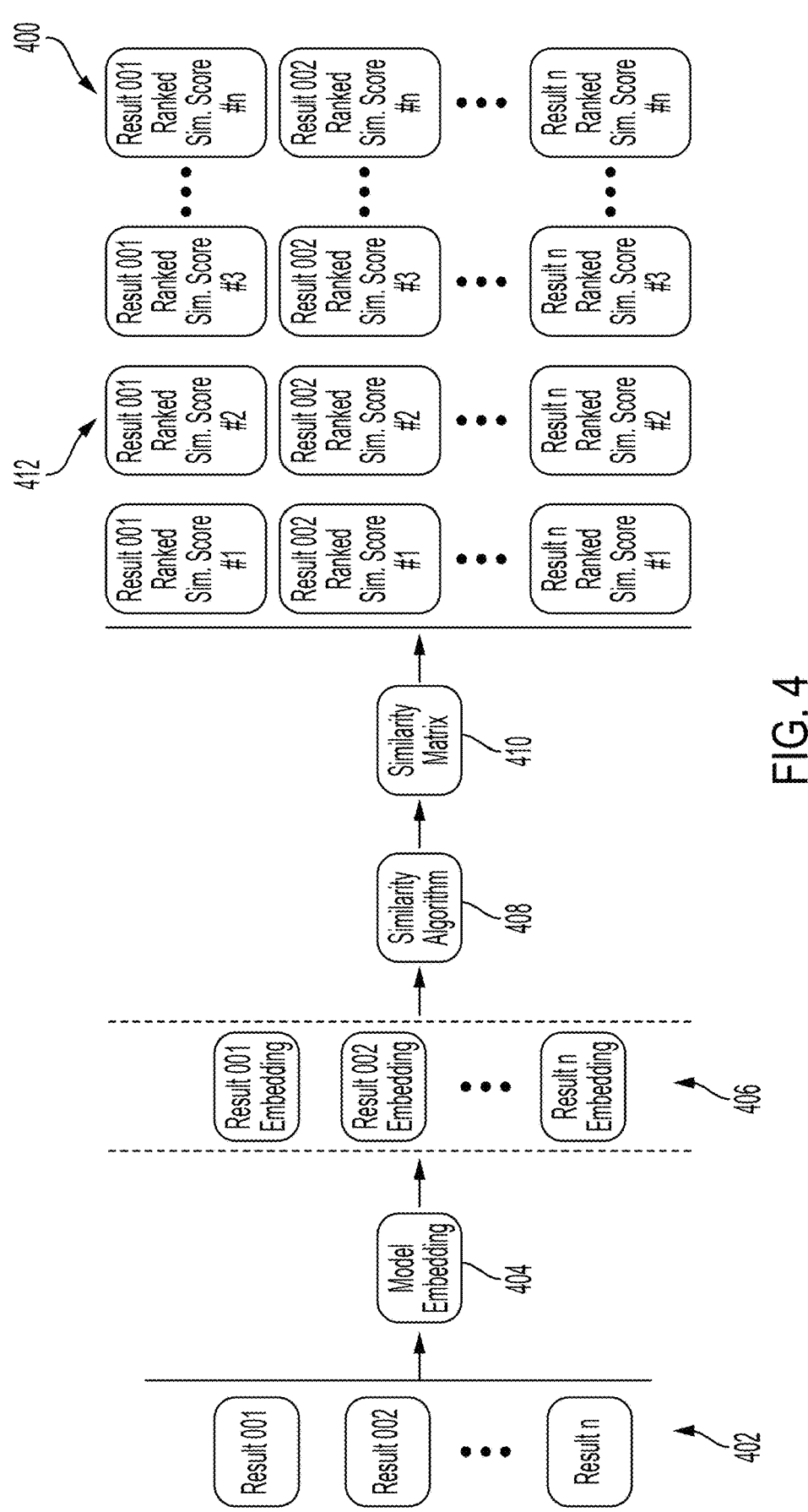
FIG. 4 is a flow diagram illustrating an embodiment of a search result de-duplication method.

FIG. 4 is a flow diagram illustrating an embodiment of a method 400 for search result deduplication. The method 400 may be implemented by or as part of any embodiment of the system and method for context-driven search result and extraction described herein. For example, the method 400 may be executed by the result extraction module 126 of system 100 to eliminate duplicate structured search results.

According to the method 400, the result extraction module 126 generates structured search results 402 (e.g., result 001, result 002, . . . result n). The result extraction module 126 applies a process for model embedding 404 using one or more trained machine learning algorithms 132. For example, the process for model embedding 404 can include an applying algorithm such as a transformer-based text-embedding model to encode the search results into high-dimensional vector representations, capturing semantic content of populated fields for subsequent comparison. Ther process for model embedding 404 generates a result embeddings 406 (result embedding 001, result embedding 002, . . . result embedding n) corresponding to each of the search results 402.

According to the method 400, the result extraction module 126 applies a similarity algorithm 408 to compute a similarity score for each possible pair of the result embedding 406. The similarity scores can be organized according to a similarity matrix 410, with each element in the matrix corresponding to a different similarity score. Metrics such as cosine similarity or Euclidean distance may be used to determine the degree of similarity between each pair of results.

The detailed similarity matrix 412 illustrates each similarity score that is calculated by the similarity algorithm 408. For example, the top row of the detailed similarity matrix 412 includes the similarity scores of the result 001 with each of the other results ranked in order of most to least similar, the second row of the detailed similarity matrix 412 includes the similarity scores of the result 002 with each of the other results ranked in order of most to least similar, etc.

According to the method 400, similarity scores above a threshold similarity (e.g., greater than 0.97 cosine similarity) may be identified as duplicate results. The result extraction module 126 may remove one of the redundant results. For example, the redundant result of the pair having the highest weighed score or most complete fields may be retained.

Figure 5:
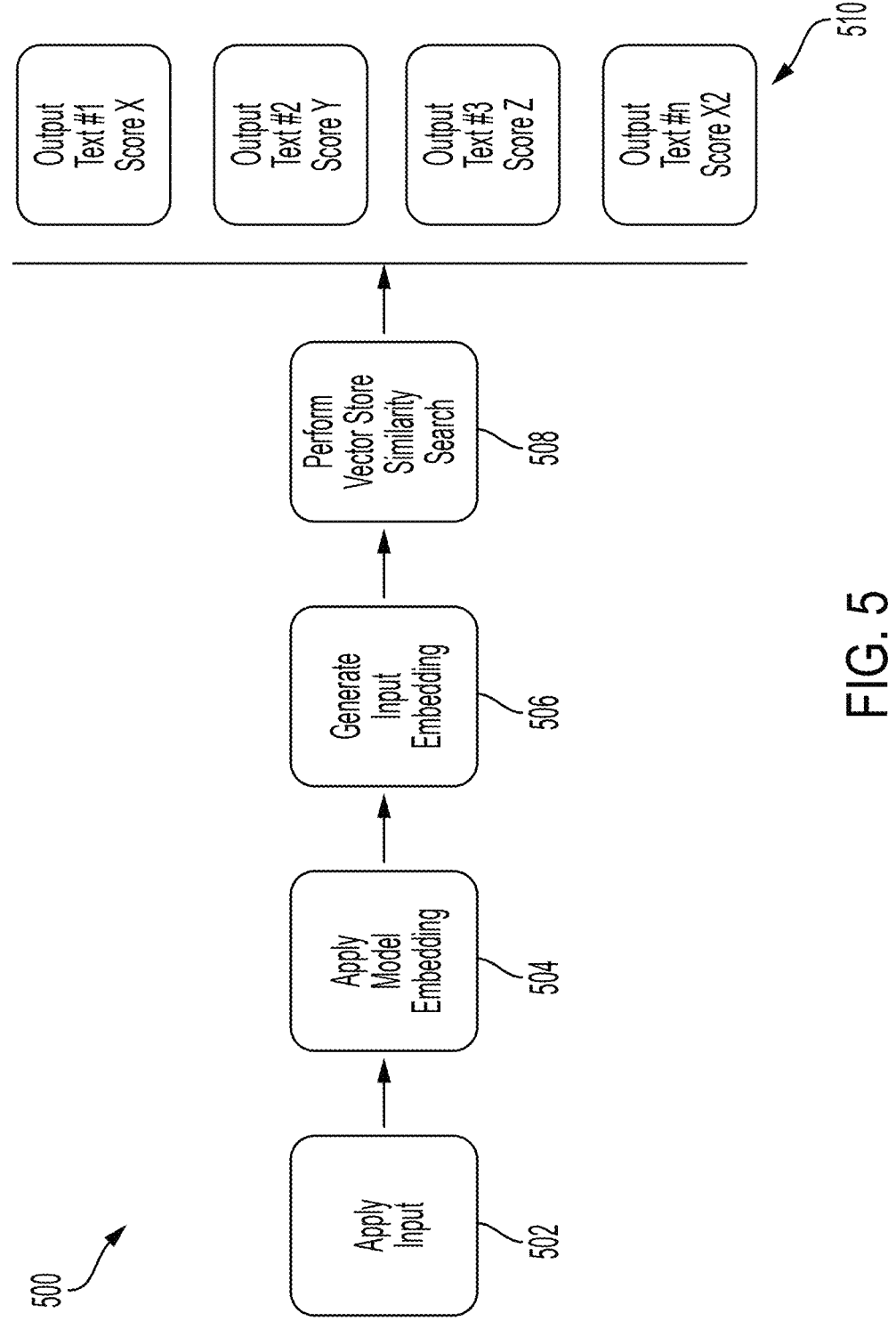
FIG. 5 is a flow diagram illustrating an embodiment of a Retrieval-Augmented Generation (RAG) method.

FIG. 5 is a flow diagram illustrating an embodiment of a Retrieval-Augmented Generation (RAG) method 500. The method 500 may be implemented by any one or more of the crawler module 122, the content extraction module 124, and/or the result extraction module 126, as discussed further herein. The method 500 can enhance the ability of the system 100 to process queries, extract content, and/or generate structured search results by combining retrieval of relevant data from a vector store with generative capabilities of one or more trained machine learning algorithms 132 from the machine learning algorithm network 130 to improve the accuracy and contextuality of outputs.

According to the method 500, the implementing module (e.g., the crawler module 122, the content extraction module 124, the result extraction module 126) receives 502 an input. For example, related to the crawler module 122, the input may include the user-defined search query. Related to the content extraction module 124, the input may include extracted content segments. Related to the result extraction module, the input may include relevant content.

According to the method 500, the implementing module applies 504 a model embedding using one or more of the trained machine learning algorithms 132, such as a transformer-based model. The one or more trained machine learning algorithms 132 encode the input into a high-dimensional vector representation. The application 504 of the model embedding process generates 506 an input embedding that captures semantic and contextual features to facilitate retrieval and generation tasks.

According to the method 500, the implementing module performs 508 a vector store similarity search by comparing the input embedding to precomputed embeddings stored in a vector database. Similarity metrics, such as cosine similarity, may be used to retrieve a set of relevant data items (e.g., content embeddings or external knowledge) having high similarity scores to augment the input with contextual information.

According to the method 500, the implementing module generates 510 an output including a ranked set of output texts (e.g., output text #1 with score X, output text #2 with score Y, output text #3 with score Z, . . . output text #n with score x2). The RAG architecture implemented by the method 500 can combine retrieved data with generative processing to produce enriched results (e.g., ranked resource matches for the crawler module 122, classified content segments for the content extraction module 124, structured search results for the result extraction module 126) each accompanied by a relevance score.

Figure 6:
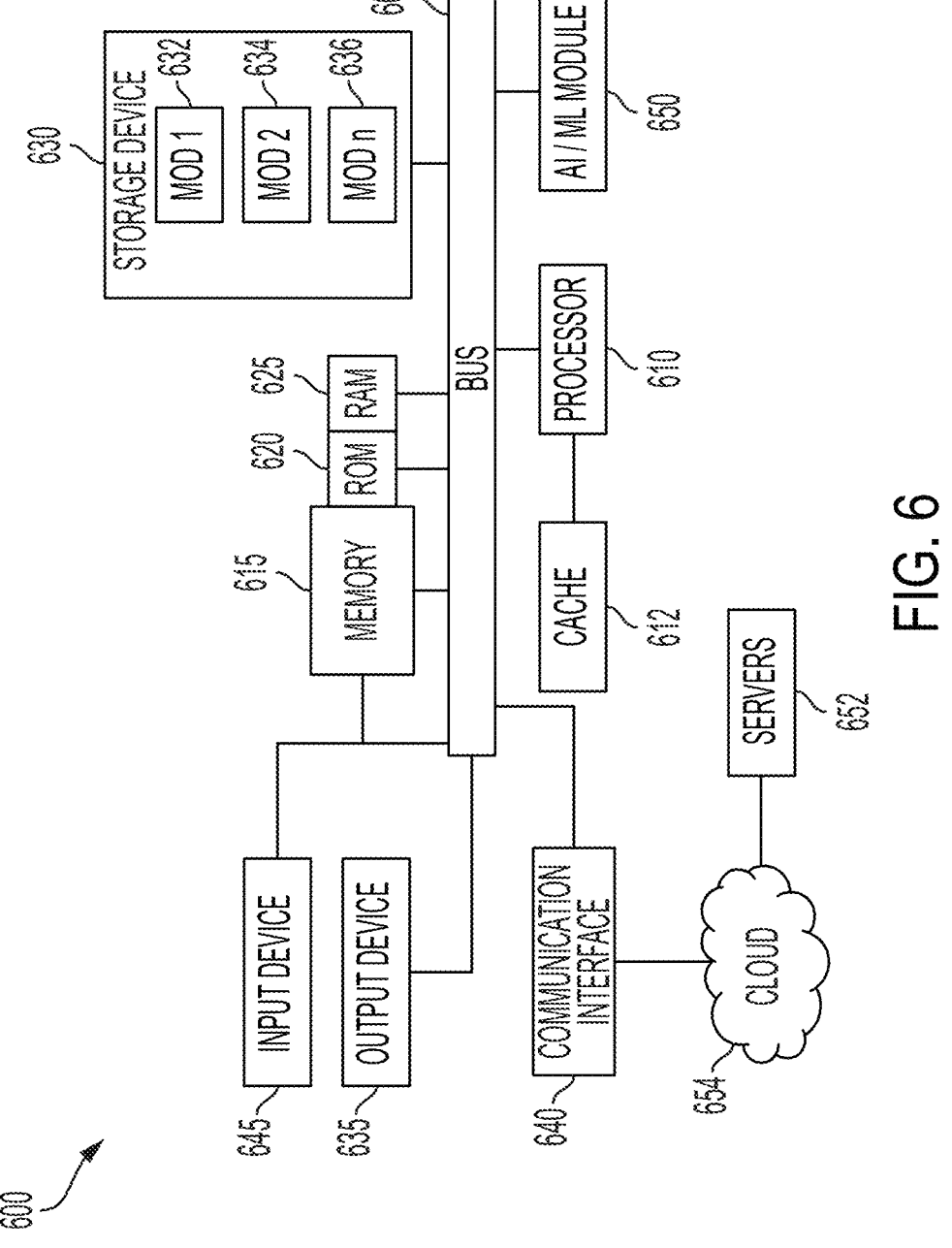
FIG. 6 illustrates an embodiment of a computing hardware environment for context-driven search and result extraction.

FIG. 6 illustrates embodiment of a hardware environment of a computing system 600 for context-driven search result and extraction. The hardware environment of the computing system 600 may be optimized for implementing the complex operations for context-driven search result and extraction as described above in connection with FIGS. 1-5, integrating both a robust, modular hardware setup and a detailed processor-based computing system.

With reference to FIG. 6, the components of the hardware environment of the computing system 600 are in communication with each other using a system bus 605. The computing system 600 can include a processing unit (CPU or processor) 610 and a system bus 605 that may couple various system components including the system memory 615, such as a read only memory 620 (ROM) and random-access memory 625 (RAM), to the processor 610. The computing system 600 can include a cache 612 of high-speed memory connected directly with, in close proximity to, or integrated as part of the processor 610.

The computing system 600 can copy data from the system memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The system memory 615 can include multiple different types of memory with different performance characteristics. The processor 610 can include any general-purpose processor and a hardware module or software module, such as module 1 632, module 2 634, up to module n 636 (where n is an integer greater than 2) stored in the storage device 630, to control the processor 610 as well as a special-purpose processor where software instructions are incorporated into the actual processor design. The processor 610 may essentially be a completely self-contained computing system, containing multiple cores or processors, a system bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media or storage which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, system bus 605, output device 635, and so forth, to carry out the function. For clarity of explanation, in some instances the present technology may be presented as including individual functional blocks including functional blocks comprising devices, device components, steps or routines in a method embodied in software, or combinations of hardware and software.

With reference to both FIG. 1 and FIG. 6, the disclosed system 100 context-driven search result and extraction can operate within a sophisticated, processor-based computing environment, such as the computing system 600, designed to perform crawling, extraction, and result generation operations with real-time precision.

The computing system 600 includes a multi-tiered memory architecture where the system memory 615 includes both read-only memory 620 (ROM) and random-access memory 625 (RAM). One aspect of the computing system 600 is its multi-layered storage infrastructure, anchored by the storage device 630. This storage device 630 includes various forms of non-volatile memory, such as solid-state drives (SSDs) and magnetic storage, housing critical data and software modules 632, 634, 636 that can control the processor 610 for executing various operations described in FIG. 1, for example. The storage device 630 can store complex software algorithms and machine learning models (e.g., any of the modules and/or machine learning algorithms discussed herein).

This configuration supports high-speed processing for tasks and data updates essential for dynamic operations for crawling, extraction, and result generation. While the ROM 620 provides core operational protocols and configurations, the high-speed RAM 625 enables the system to handle real-time updates to queries, content nodes, vector databases, etc. Furthermore, a storage device 630, including SSDs and magnetic storage, houses critical data and software modules necessary for executing crawling, extraction, and result generation functions. This storage system retains historical records, operational data, and machine learning models.

Artificial intelligence (AI) and machine learning (ML) modules 650 may be embedded within the computing system 600 to improve various processes related to crawling, extraction, and result generation. For example, AI and ML modules 650 may include any of the trained machine learning algorithms 132 of the machine learning algorithm network 130, as discussed further herein.

A suite of data collection and input/output (I/O) devices may be employed to monitor and interact with the system 100. Input devices 645, keyboards, mouses, touchscreens, microphone, cameras, RFID readers, and/or IoT sensors can capture real-time data. This data feeds into the processor 610 for seamless integration the computing system 600, enabling precise, on-the-fly adjustments. Output devices, such as digital displays, speakers, wearable alerts, and screens, provide real-time feedback to users. The range of input and output devices, including the input device 645 and the output device 635, can enable users to interact directly with the system 100, for example, via the interface module 110.

In various embodiments, the computing system 600 is extended and supported by a scalable cloud-based infrastructure 654, which provides scalable storage, processing power, and data analytics.

The scalable cloud-based infrastructure 654 also serves as the primary hub for inter-facility communication, linking regional facilities to a central command system that monitors and directs tasks across the network. When additional processing capacity is required, the system can dynamically allocate cloud resources, ensuring that computational workloads related to predictive analytics, complex task sequencing, and resource optimization are handled efficiently. Additionally, data redundancy protocols within the cloud architecture safeguard operational data, ensuring recovery from hardware failure or data loss scenarios.

The computing system 600 may be processor-based. The processor-based computing system operates within a cloud-enabled, modular hardware environment designed for scalability and high availability. This broader infrastructure can include additional AI-optimized processing units, such as TPUs and GPUs, which are capable of handling the intensive computational requirements of machine learning algorithms used for demand forecasting, slotting optimization, and real-time task adjustments. The modular cloud architecture ensures that each facility can access centralized data and processing power, dynamically adjusting workflows based on system demands. It also allows the modules to allocate resources optimally, whether from central servers or distributed cloud resource-specific processors, depending on task priorities and operational constraints.

The scalable cloud-based infrastructure 654 provides flexible storage, processing, and analytics capabilities across distributed facilities. Cloud integration supports storage of historical data, remote processing of compute-intensive machine learning models, and real-time data access for multiple facilities. Managed through containerized applications and virtual machines, the cloud framework can enable continuous software updates, enhanced disaster recovery, and dynamic resource allocation to accommodate varying operational demands. Cloud-based inter-facility communication ensures synchronized, efficient operations, with additional processing capacity allocated as needed.

Energy efficiency may be prioritized within the design of the system 100, with power management protocols integrated across hardware components to reduce the system's environmental impact. The distributed power architecture, supported by uninterruptible power supplies (UPS) and backup generators, ensures reliable operation and minimizes downtime, allowing the system to maintain continuity and efficiency during power disruptions.

The system 100 can include security protocols to ensure data integrity, privacy, and compliance with regulatory standards. These include end-to-end encryption, multi-factor authentication, role-based access control, and real-time monitoring via firewalls and intrusion detection systems. An AI-based anomaly detection component monitors access patterns and data consistency, flagging unusual activities. Additionally, encrypted logging and audit trails facilitate transparency and compliance with regulations such as GDPR for data privacy, while data sovereignty protocols ensure that sensitive information meets regional compliance standards.

The computing system 600 can offer a comprehensive solution for crawling, extraction, and result generation operations, combining high-performance processing, advanced memory configurations, scalable cloud-based resources, and robust communication interfaces. The elements of the computing system 600 can establish a high-performance environment that supports continuous adaptation, precise task orchestration, and predictive optimization.

FIG. 7 is a flow diagram illustrating an embodiment of a method 700 for context-driven search and result extraction in a network of content nodes. In one embodiment, the method 700 includes obtaining 702 a user-defined search query that includes search parameters for extracting search results from at least one target content node. The method 700 further includes processing 704 the user-defined search query to extract relevant search results using a trained machine learning algorithm. The method 700 further includes presenting 706 the structured search results to a user. The method 700 further includes obtaining 708 user feedback based on the structured search results. The method 700 further includes adapting 710 the trained machine learning algorithm based on the user feedback.

The processing 704 function includes extracting 712 the user-defined search query to extract the search parameters. Processing 704 further includes generating 714 a query embedding based on the extracted search parameters. Processing 704 further includes locating 716 the at least one target node in the network of content nodes. Processing 704 further includes obtaining 718 content embeddings corresponding to resources of each target content node. Processing 704 further includes navigating 720 to matched resources of each target content node corresponding to semantic matches of the query embedding within the content embeddings. Processing 704 further includes parsing 722 each of the identified matched resources into relevant content and non-relevant content based on the corresponding content embeddings. Processing 704 further includes determining 724 a set of fields to structure the relevant content from the matched resources. Processing 704 further includes generating 726 a structured search result for each of the matched resources by selectively populating the set of fields based on the relevant content.

In another embodiment, the method 700 includes identifying nested links within the matched resources corresponding to additional resources of the at least one target content node and communicating the nested links to the crawler module for identifying additional semantic matches.

In another embodiment, the method 700 further includes defining weights for each field of the set of fields and scoring each of the structured search results based on the weights of the populated set of fields.

In another embodiment the method 700 further includes generating a result embedding for each of the structured search results, determining a similarity of each result embedding with the other result embeddings, and removing duplicate structured search results for result embeddings having a similarity with each other greater than a predetermined threshold.

In another embodiment, the method 700 includes dynamically selecting a preferred trained machine learning algorithm from a plurality of trained machine learning algorithms to use for one or more of the first trained machine learning algorithm, the second trained machine learning algorithm, and the third trained machine learning algorithm based on the search parameters. In another aspect, the method 700 further includes selecting the preferred trained machine learning algorithm to use for one or more of the first trained machine learning algorithm, the second trained machine learning algorithm, and the third trained machine learning algorithm based on the search parameters.

In another embodiment, the method 700 further includes communicating with a search engine to select the at least one target content node based on the search parameters.

In another embodiment, the method 700 further includes generating the query embedding, searching the vector database for the content embeddings based on a similarity with the query embedding, and determining the matched resources based on the content embeddings having a similarity with the query embedding greater than a predetermined threshold.

The method 700 described in FIG. 7 may be implemented by the system 100, as described herein. With reference now to FIG. 7 in conjunction with FIG. 1, according to the method 700, an interface module 110 obtains 702 a user-defined search query that includes search parameters for extracting search results from at least one target content node. a query processing module 120 processes 704 the user-defined search query to extract relevant search results using a trained machine learning algorithm. The interface module 110 presents 706 the structured search results to a user. The interface module 110 obtains 708 user feedback based on the structured search results. The query processing module adapts 710 the trained machine learning algorithm based on the user feedback.

In one embodiment, to implement the processing 704 function, the crawler module 122 extracts 712 the user-defined search query to extract the search parameters. The crawler module 122 generates 714 a query embedding based on the extracted search parameters. The crawler module 122 locates 716 the at least one target node in the network of content nodes. The crawler module 122 obtains 718 from a vector database, content embeddings corresponding to resources of each target content node. The crawler module 122 navigates 720 to matched resources of each target content node corresponding to semantic matches of the query embedding within the content embeddings. The content extraction module 124 parses 722 each of the identified matched resources into relevant content and non-relevant content based on the corresponding content embeddings. The result extraction module 126 determines 724 a set of fields to structure the relevant content from the matched resources. The result extraction module 126 generates 726 a structured search result for each of the matched resources by selectively populating the set of fields based on the relevant content.

In another embodiment, the content extraction module 124 identifies nested links within the matched resources corresponding to additional resources of the at least one target content node. The content extraction module 124 communicates the nested links to the crawler module for identifying additional semantic matches.

In another embodiment, the result extraction module 126 defines weights for each field of the set of fields. The result extraction module 126 scores each of the structured search results based on the weights of the populated set of fields.

In another embodiment, the result extraction module 126 generates a result embedding for each of the structured search results. The result extraction module 126 determines a similarity of each result embedding with the other result embeddings. The result extraction module 126 removes duplicate structured search results for result embeddings having a similarity with each other greater than a predetermined threshold.

In another embodiment, the crawler module 122 uses a first trained machine learning algorithm 132₁, the content extraction module 124 uses a second trained machine learning algorithm 132₂, and the result extraction module 126 uses a third trained machine learning algorithm 132₃. In one aspect, the interface module 110 dynamically selects a preferred trained machine learning algorithm from a plurality of trained machine learning algorithms to use for one or more of the first trained machine learning algorithm, the second trained machine learning algorithm, and the third trained machine learning algorithm based on the search parameters. In another aspect, the interface module 110 includes an agentic artificial intelligence agent to select the preferred trained machine learning algorithm to use for one or more of the first trained machine learning algorithm, the second trained machine learning algorithm, and the third trained machine learning algorithm based on the search parameters.

In another embodiment, the interface module 110 communicates with a search engine to select the at least one target content node based on the search parameters.

In another embodiment, the crawler module 122 utilizes a retrieval-augmented generation process that to generate the query embedding, search the vector database for the content embeddings based on a similarity with the query embedding, and determine the matched resources based on the content embeddings having a similarity with the query embedding greater than a predetermined threshold.

Within the context of this disclosure, the term "module" is used as a broad and flexible term to describe a component of the system that can be implemented using hardware, software, firmware, or a combination of these to perform one or more specific tasks or operations. A module may be implemented using various types of technology, including but not limited to:

Hardware: A physical device or circuit that executes predefined functions. Hardware modules may include, but are not limited to, processors (e.g., central processing units (CPUs), digital signal processors (DSPs), graphical processing units (GPUs)), memory components (RAM, ROM, flash memory), network interfaces, power management systems, or specialized chips such as application-specific integrated circuits (ASICs) or field-programmable gate arrays (FPGAs). These components may be connected through buses, networks, or communication interfaces, providing the necessary infrastructure for high-speed data transfer and execution of operations.

Software: A set of instructions stored in memory and executed by processing units. Software modules may include executable code, dynamic link libraries (DLLs), software development kits (SDKs), virtual machine environments, or applications. These modules are responsible for implementing algorithms, data processing, decision-making logic, and user interface functionalities. Software modules can be written in various programming languages (e.g., C++, Python, Java) and can interact with other modules through well-defined APIs, middleware, or cloud-based services.

Firmware: Low-level code stored in non-volatile memory (e.g., EEPROM, flash memory) that bridges the gap between hardware and higher-level software. Firmware modules provide the control logic necessary to configure, initialize, and manage hardware devices. Firmware can handle essential tasks such as device bootstrapping, protocol handling, and power management. Firmware updates may be delivered remotely, enabling post-deployment enhancements and security patches without requiring hardware modifications.

Modules are capable of interacting with other modules via inter-module communication within the system through standard communication protocols such as Inter-Process Communication (IPC), message passing, remote procedure calls (RPC), or data buses. This allows for distributed operations across different hardware or software environments, whether local or over a network. The use of APIs, middleware layers, or network protocols (e.g., REST, gRPC) facilitates seamless communication between modules regardless of their underlying implementation.

Modules are designed with modularity and scalability features via a plug-and-play architecture, enabling the system to dynamically add, remove, or modify modules as needed. This modularity allows the system to scale efficiently, either horizontally (by adding more modules for parallel processing) or vertically (by enhancing the capabilities of individual modules). This feature is particularly useful in distributed computing environments, such as cloud platforms or multi-core processors.

Modules can be designed to support multi-threading, parallel execution, or distributed computing architectures, where tasks are split across multiple hardware resources (e.g., multi-core processors, distributed nodes). Load balancing and task synchronization mechanisms ensure efficient resource utilization, minimizing execution time for complex operations.

Modules can integrate AI-driven components such as machine learning models or neural networks to perform tasks like pattern recognition, decision-making, and predictive analytics. These AI modules can be pre-trained models or dynamically updated through continuous learning, depending on the application's requirements. Modules can leverage specialized AI hardware accelerators such as TPUs (Tensor Processing Units) or GPUs for high-performance processing.

For time-sensitive applications, modules may feature real-time processing capabilities, including low-latency processing, task prioritization, and event-driven architectures. Real-time operating systems (RTOS) or real-time task schedulers can be used within firmware or software modules to ensure that critical tasks are completed within specific time constraints.

Modules may incorporate security mechanisms such as encryption, authentication, and access control to protect data and ensure the integrity of operations. Secure hardware modules (e.g., Trusted Platform Modules (TPMs) or secure enclaves) may be used to store cryptographic keys and execute secure operations, while software-based modules may implement firewalls, intrusion detection systems (IDS), or secure communication protocols (e.g., TLS/SSL).

Modules may manage and store data using embedded databases, cloud storage services, or other data management and persistence mechanisms. Data synchronization across distributed systems may be supported through version control, replication strategies, and consistency models (e.g., eventual consistency, strong consistency).

Modules are adaptable for deployment in cloud environments or edge computing frameworks. Cloud-based modules can dynamically scale according to demand, leveraging elastic resources, while edge modules perform low-latency processing closer to the data source, reducing dependency on centralized cloud systems.

In environments where power consumption is critical (e.g., IoT devices or battery-operated systems), modules may include energy-efficient designs, such as power-aware algorithms, dynamic voltage scaling, sleep modes, or energy harvesting technologies. Hardware modules may implement low-power designs using specific semiconductor technologies optimized for minimal energy usage.

Each module may be designed to function as an independent, reusable component within a larger system architecture, while maintaining compatibility with other modules. This modular approach allows for flexibility in system design, enabling easy upgrades, extensions, and maintenance. Whether deployed on dedicated hardware, within virtualized environments, or across distributed networks, modules provide the foundational building blocks for the functionality of the system 100.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical storage, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for context-driven search and result extraction in a network of content nodes, the system comprising:
an interface module configured to:
obtain a user-defined search query comprising search parameters for extracting search results from at least one target content node;
present structured search results to the user; and
obtain user feedback based on the structured search results;
a query processing module configured to process the user-defined search query and extract relevant search results using at least one trained machine learning algorithm, the query processing module comprising:
a crawler module configured to:
process the user-defined search query to extract the search parameters;
generate a query embedding based on the extracted search parameters, the query embedding comprising a vector representation of the extracted search parameters;
locate the at least one target content node in the network of content nodes;
obtain content embeddings corresponding to resources located at each target content node from a vector database, the content embeddings comprising vector representations of the resources located at the target content nodes;

determine semantic matches to the query embedding within the obtained content embeddings, wherein the semantic matches correspond to resources within the target content nodes matching the query, and the semantic matches are determined by searching the vector database for content embeddings having a similarity with the query embedding satisfying a similarity threshold; and navigate to the matched resources identified in each target content node;

a content extraction module configured to parse each of the identified matched resources into relevant content and non-relevant content based on the corresponding content embeddings, and a result extraction module communicatively coupled to the interface module configured to:

determine a set of fields to structure the relevant content from the matched resources; and generate a structured search result for each of the matched resources by selectively populating the set of fields based on the content embeddings of the relevant content, wherein the query processing module is configured to receive and process the user feedback to adapt the trained machine learning algorithm.

2. The system of claim 1, wherein the content extraction module is configured to:

identify, within the matched resources, nested links corresponding to additional resources of the at least one target content node; and communicate the nested links to the crawler module for determining additional semantic matches.

3. The system of claim 1, wherein the result extraction module is configured to:

define weights for each field of the set of fields; and score each of the structured search results based on the weights of the populated fields.

4. The system of claim 1, wherein the result extraction module is configured to:

generate a result embedding for each of the structured search results;

determine a similarity of each result embedding with the other result embeddings; and remove duplicate structured search results for result embeddings having a similarity with each other greater than a predetermined threshold.

5. The system of claim 1, wherein the crawler module uses a first trained machine learning algorithm, wherein the content extraction module uses a second trained machine learning algorithm, and wherein the result extraction module uses a third trained machine learning algorithm.

6. The system of claim 5, wherein the interface module is configured to dynamically select a preferred trained machine learning algorithm from a plurality of trained machine learning algorithms to use for one or more of the first trained machine learning algorithm, the second trained machine learning algorithm, and the third trained machine learning algorithm based on the search parameters.

7. The system of claim 6, wherein the interface module comprises an agentic artificial intelligence agent configured to select the preferred trained machine learning algorithm to use for one or more of the first trained machine learning algorithm, the second trained machine learning algorithm, and the third trained machine learning algorithm based on the search parameters.

8. The system of claim 1, wherein the interface module is configured to communicate with a search engine to select the at least one target content node based on the search parameters.

9. The system of claim 1, wherein the crawler module is configured to utilize a retrieval-augmented generation process to:

generate the query embedding;

search the vector database for the content embeddings based on a similarity with the query embedding; and determine the semantic matches corresponding to the matched resources based on the content embeddings having a similarity with the query embedding greater than the similarity threshold.

10. The system of claim 1, wherein adapting the trained machine learning algorithm comprises adjusting one or more weights of the trained machine learning algorithm based on the user feedback.

11. A method for context-driven search and result extraction in a network of content nodes, the method comprising:

obtaining, by an interface module, a user-defined search query comprising search parameters for extracting search results from at least one target content node;

processing, by a query processing module, the user-defined search query to extract relevant search results using a trained machine learning algorithm, wherein the processing comprises:

extracting, by a crawler module, the user-defined search query to extract the search parameters;

generating, by the crawler module, a query embedding based on the extracted search parameters, the query embedding comprising a vector representation of the extracted search parameters;

locating, by the crawler module, the at least one target content node in the network of content nodes;

obtaining, by the crawler module from a vector database, content embeddings corresponding to resources of each target content node, the content embeddings comprising vector representations of the resources located at the target content nodes;

determining semantic matches to the query embedding within the obtained content embeddings, wherein the semantic matches correspond to resources within the target content nodes matching the query, and the semantic matches are determined by searching the vector database for content embeddings having a similarity with the query embedding satisfying a similarity threshold;

navigating, by the crawler module, to the matched resources of each target content node corresponding to the semantic matches of the query embedding;

parsing, by a content extraction module, each of the identified matched resources into relevant content and non-relevant content based on the corresponding content embeddings;

determining, by a result extraction module, a set of fields to structure the relevant content from the matched resources; and generating, by the result extraction module, a structured search result for each of the matched resources by selectively populating the set of fields based on the relevant content;

presenting, by the interface module, the structured search results to a user;

obtaining, by the interface module, user feedback based on the structured search results; and adapting, by the processing module, the trained machine learning algorithm based on the user feedback.

12. The method of claim 11, further comprising:

identifying, by content extraction module, nested links within the matched resources corresponding to additional resources of the at least one target content node; and communicating, by content extraction module, the nested links to the crawler module for identifying additional semantic matches.

13. The method of claim 11, further comprising:

defining, by the result extraction module, weights for each field of the set of fields; and scoring, by the result extraction module, each of the structured search results based on the weights of the populated set of fields.

14. The method of claim 11, further comprising:

generating, by the result extraction module, a result embedding for each of the structured search results;

determining, by the result extraction module, a similarity of each result embedding with the other result embeddings; and removing, by the result extraction module, duplicate structured search results for result embeddings having a similarity with each other greater than a predetermined threshold.

15. The method of claim 11, wherein the crawler module uses a first trained machine learning algorithm, wherein the content extraction module uses a second trained machine learning algorithm, and wherein the result extraction module uses a third trained machine learning algorithm.

16. The method of claim 15, further comprising:

dynamically selecting, by the interface module, a preferred trained machine learning algorithm from a plurality of trained machine learning algorithms to use for one or more of the first trained machine learning algorithm, the second trained machine learning algorithm, and the third trained machine learning algorithm based on the search parameters.

17. The method of claim 16, wherein the interface module comprises an agentic artificial intelligence agent configured to select the preferred trained machine learning algorithm to use for one or more of the first trained machine learning algorithm, the second trained machine learning algorithm, and the third trained machine learning algorithm based on the search parameters.

18. The method of claim 11, further comprising:

communicating, by the interface module, with a search engine to select the at least one target content node based on the search parameters.

19. The method of claim 11, wherein the crawler module is configured to utilize a retrieval-augmented generation process comprising:

generating the query embedding;

searching the vector database for the content embeddings based on a similarity with the query embedding; and determining the matched resources based on the content embeddings having a similarity with the query embedding greater than the similarity threshold.

20. A non-transitory computer-readable medium storing instructions that, when executed by one or more processors, cause a computing system to:

obtain a user-defined search query comprising search parameters for extracting search results from at least one target content node of a network of content nodes;

process the user-defined search query and extract relevant search results using a trained machine learning algorithm, wherein the instructions to process the user-defined search query cause the computing system to:

process the user-defined search query to extract the search parameters;

generate a query embedding based on the extracted search parameters the query embedding comprising a vector representation of the extracted search parameters;

locate the at least one target content node in the network of content nodes;

obtain content embeddings corresponding to resources of each target content node from a vector database, the content embeddings comprising vector representations of the resources located at the target content nodes;

determine semantic matches to the query embedding within the obtained content embeddings, wherein the semantic matches correspond to resources within the target content nodes matching the query, and the semantic matches are determined by searching the vector database for content embeddings having a similarity with the query embedding satisfying a similarity threshold;

navigate to the matched resources of the target content nodes;

parse each of the identified matched resources into relevant content and non-relevant content based on the corresponding content embeddings;

determine a set of fields to structure the relevant content from the matched resources; and generate a structured search result for each of the matched resources by selectively populating the set of fields based on the content embeddings of the relevant content;

present the structured search results to the user via a user interface;

obtain user feedback based on the structured search results; and adapt the trained machine learning algorithm based on the user feedback.

* * * * *